United States Patent [19]

Martinez

[11] Patent Number: 5,310,023

[45] Date of Patent: May 10, 1994

[54] SENSOR AND WARNING INDICATOR FOR AIRBRAKE RODS

[76] Inventor: Antonio Martinez, 11231 Fineview St., El Monte, Calif. 91733

[21] Appl. No.: 889,220

[22] Filed: May 27, 1992

[51] Int. Cl.⁵ .............................................. B60Q 1/00
[52] U.S. Cl. .................................................. 188/1.11
[58] Field of Search ...................... 188/1.11, 365, 356, 188/152

[56] References Cited

U.S. PATENT DOCUMENTS

| | | | |
|---|---|---|---|
| 3,776,329 | 12/1973 | Hope et al. | 188/1.11 |
| 4,316,065 | 2/1982 | Rupp et al. | 188/1.11 |
| 4,583,071 | 4/1986 | Sebalos et al. | 188/1.11 |
| 4,757,300 | 7/1988 | Sebalos | 188/1.11 |
| 4,800,991 | 1/1989 | Miller | 188/1.11 |

*Primary Examiner*—Matthew C. Graham
*Attorney, Agent, or Firm*—Donald D. Mon

[57] ABSTRACT

A sensor for detecting overtravel of a brake rod. The sensor includes a first part attached to the housing of a pneumatic brake actuator, and a second part connected to the rod. One part is a body having an axial passage, with a pair of axially-extending conductors in its wall. The other part is a rod having a conductive head which will bridge the conductors to enable an electrical current to pass when the rod is in a position respective to overtravel.

2 Claims, 2 Drawing Sheets

SENSOR AND WARNING INDICATOR FOR AIRBRAKE RODS

FIELD OF THE INVENTION

A sensor and indicator responsive to movement of a brake actuator rod, which senses an unsafe brake condition as a function of rod overtravel.

BACKGROUND OF THE INVENTION

Brake actuators for vehicular air brakes have a power chamber into which air is supplied to apply a pressure against a diaphragm. The diaphragm in turn forces a brake rod to apply the brakes. In a correctly adjusted brake system, the rod should not travel more than about two inches to apply the brakes. For example, one inch of rod travel translates into 0.020 inches of brake lining wear. Excessive rod travel reflects worn linings, or damaged drums. In either event it is an unsafe condition, and when found by law enforcement agencies, results in citations, and even holding the vehicle until after repairs are made.

It is an object of this invention to provide a sensor that can be attached to the brake actuator and to the rod which can sense an give warning when the rod extension exceeds a maximum safe limit.

BRIEF DESCRIPTION OF THE INVENTION

A sensor according to this invention has a first and a second part arranged in a sliding relationship. One part is attached to the brake actuator, and the other part is attached to the brake rod. When the brakes are applied, the rod is moved relative to the actuator housing and the two sensor parts are moved relative to each other. There is a defined range of safe and effective brake movement. If movement beyond that range occurs, it reflects an unsafe brake condition.

According to this invention, means is provided to sense and if desired to indicate excessive brake rod travel.

According to a preferred feature of this invention, switch means is interposed between the sensor parts which changes its switching condition when excess travel occurs.

According to an optional feature of the invention, one of the parts can be color-coded so as to visually indicate excessive brake rod travel when the brakes are applied.

The above and other features of this invention will be fully understood from the following detailed description and the accompanying drawings, in which:

DETAILED DESCRIPTION OF THE INVENTION

Figure 1:
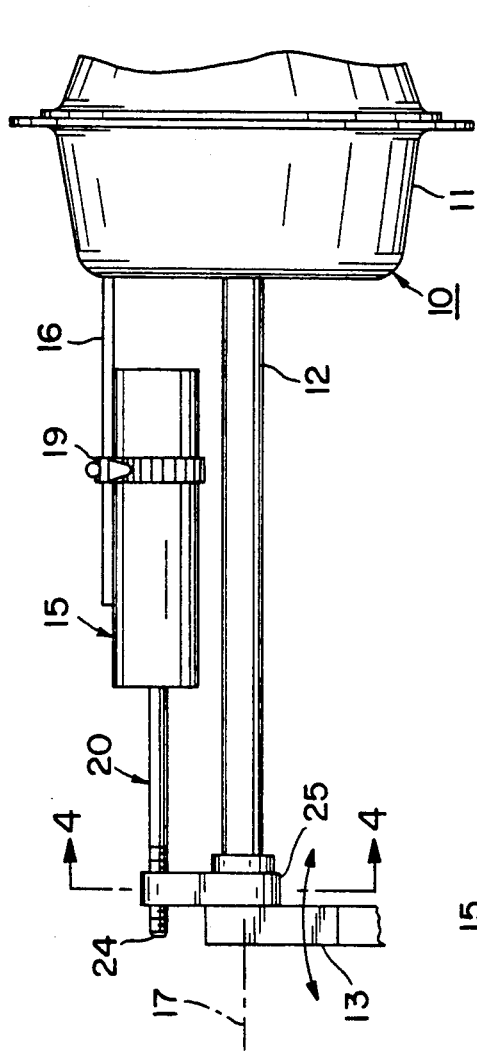
FIG. 1 shows the preferred embodiment of the invention, installed in a brake system.

A brake actuator 10 is shown in FIG. 1. It has a housing 11 from which there projects a brake rod 12. Internally of the housing there is a diaphragm in a power chamber (not shown). To apply brakes, air under pressure is injected into the chamber, and the rod is driven to the left in FIG. 1 to apply the brakes through a linkage system. These systems are standard and well-known, and require no detailed description here.

Rumsey U.S. Pat. No. 4,850,263 is incorporated herein by reference in its entirety for its showing of such a housing, brake rod, and braking system.

The axial movement of the brake rod is transformed into a torque force by brake lever 13 to set the brake. As the brake linings or the brake drum wear, the brake rod must extend farther in order to apply the brakes. It follows that there is a safe range of brake rod extensions which is respective to a brake system with good drums and linings, and which is correctly adjusted. Overtravel reflects a serious problem, usually excessively worn brake linings.

Sensor 15 is shown mounted to housing 11 by a bracket 16. The bracket extends parallel to an axis 17. The first element 18 (a case) of the sensor lays against the bracket, and is held to it by any suitable attachment means 19, which might, for example, be a tight but releasable band. Accordingly, an element 18 can adjustably be positioned along the bracket, relative to the actuator housing. Once properly placed, it is rarely moved, although it can be.

Figure 4:
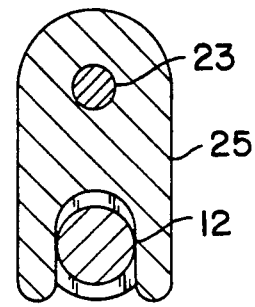
FIG. 4 is a cross-section taken at line 4—4 in FIG. 1.
Figure 5:
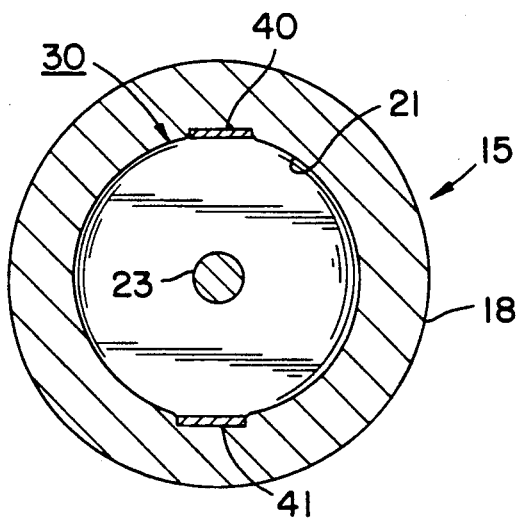
FIG. 5 is a cross-section taken at line 5—5 in FIG. 2.

A second element 20 of the sensor is slidably fitted in a passage 21 in element 18. It has a head 22 and a post 23 to which the head is attached. At its free end 24, post 23 is connected by a clevis 25 to the brake rod (FIG. 4).

It will now be seen that axial movement of the brake rod results in an identical axial movement of element 20 in element 18.

Switching means 30 is provided between the two elements of the sensor. Any suitable switching means can be used which changes its condition when the post travels beyond a pre-selected limit. However, these devices are used in very severe conditions, and simplicity and least moving parts are desired.

In the illustrated embodiment, the switching means comprises a pair of conductive strips 40, 41, placed 180 degrees apart fixed to element 18. Strips 40, 41 have respective portions 42, 43 extending axially inside the case, in respective grooves 44, 45. They pass through respective gaps 46, 47 and extend to form axial extending terminals 48, 49.

The switching means further includes a conductive periphery 50 on head 22.

Figure 2:
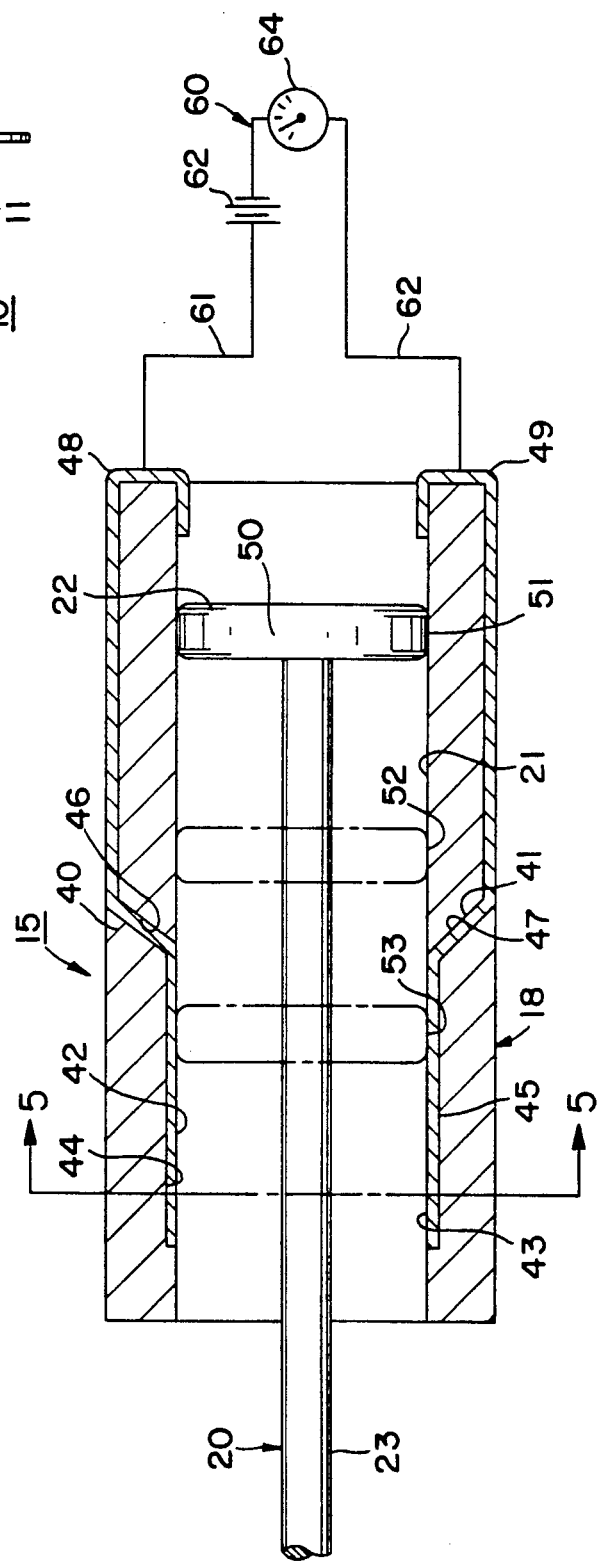
FIG. 2 is an axial cross-section of FIG. 1.
Figure 3:
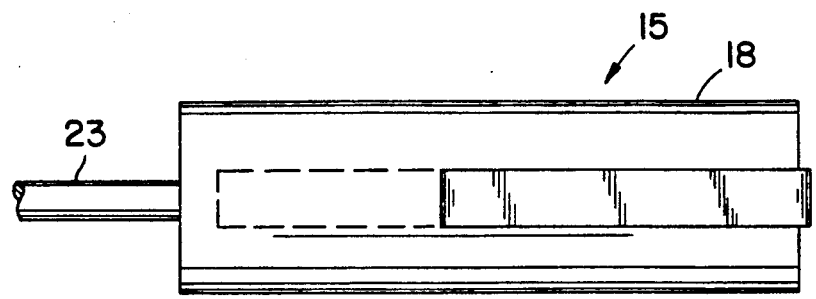
FIG. 3 is a side view of FIG. 2.

As can be seen in FIG. 2, when the head is in positions 51 and 52, it does not bridge the strips, and does not complete a circuit between them. As soon as it does bridge them, a circuit is complete between them. For example in position 53 the circuit is completed, although it will have been completed sooner, as soon as the head reaches the strips. Thus movement of the rod in the range where the head does not bridge the strips represents the safe range of brake rod movement, an movement to where it does bridge the strips represents unsafe brake conditions.

A responsive circuit 60 includes leads 61, 62 connected to the strips, which incorporate a battery 63 and an indicator 64 such as a lamp or horn. Excessive rod movement will light the lamp, or actuate an audible signal, as desired.

The case can be closed by suitable end caps, with the post sliding through one of them. The post can be color coded, so that when the color red, for example, becomes exposed as a consequence of overtravel, a visual interpretation is possible.

This invention is not to be limited by the embodiment shown in the drawings and described in the description, which is given by way of example and not of limitation, but only in accordance to the scope of the appended claims.

I claim:

1. A sensor for detecting overtravel of a brake rod relative to a housing of a brake actuator, said brake rod being movable relative to said housing for the purpose of applying vehicular brakes, whereby to detect an unsafe brake condition respective to overtravel of said brake rod, said sensor comprising a first and second part joined together for relative sliding movement, with one part connected to said housing, and the other part connected to said rod, and switching means interlinking said parts adapted to change its switching conditions when one part has reached or passed a predetermined limit respective to braking conditions, one of said parts being a case having a passage therein, and the other being a post slidably mounted in said case, said switching means comprising a pair of angularly spaced apart axially-extending conductive strips in said passage, and a conductive portion on a head to which said post is mounted, said head fitting in said passage, and said conductive portion being adapted to conductively bridge said strips at and beyond said predetermined limit.

2. A sensor according to claim 1 in which circuit means is connected to said switching means to provide an indication whether said predetermined limit has been reached or passed.

* * * * *